(12) United States Patent
Hsieh et al.

(10) Patent No.: US 9,240,738 B2
(45) Date of Patent: Jan. 19, 2016

(54) INTERLOCKING DEVICE AND THREE-PHASE INTERLOCKING DEVICE FOR DC TO AC CONVERTER

(71) Applicant: INDUSTRIAL TECHNOLOGY RESEARCH INSTITUTE, Hsinchu (TW)

(72) Inventors: Min-Ju Hsieh, Kaohsiung (TW); Hsi-Chih Chang, Hsinchu (TW); Shu-Syuan Huang, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 263 days.

(21) Appl. No.: 14/137,338

(22) Filed: Dec. 20, 2013

(65) Prior Publication Data

US 2015/0155796 A1    Jun. 4, 2015

(30) Foreign Application Priority Data

Nov. 29, 2013 (TW) .............................. 102143884 A

(51) Int. Cl.
*H02M 1/38* (2007.01)
*H02M 7/487* (2007.01)
*H02M 1/32* (2007.01)

(52) U.S. Cl.
CPC ................ *H02M 7/487* (2013.01); *H02M 1/32* (2013.01)

(58) Field of Classification Search
CPC ............................ H02M 1/38; H02M 7/53871
USPC ............................... 363/41, 43, 56.04, 98, 132
See application file for complete search history.

(56) References Cited

U.S. PATENT DOCUMENTS 3,928,789 A    12/1975    Elias
4,126,819 A    11/1978    Stobbe et al.
(Continued)

FOREIGN PATENT DOCUMENTS

| CN | 102710116 A | 10/2012 |
| CN | 202663288 U | 1/2013 |
| CN | 202713131 U | 1/2013 |
| CN | 103138554 A | 6/2013 |
| CN | 203251221 U | 10/2013 |

OTHER PUBLICATIONS

Intellectual Property Office, Ministry of Economic Affairs, R.O.C., "Office Action", Jun. 16, 2015, Taiwan.
(Continued)

*Primary Examiner* — Jeffrey Sterrett
(74) *Attorney, Agent, or Firm* — Locke Lord LLP; Tim Tingkang Xia, Esq.

(57) ABSTRACT

The disclosure provides an interlocking device and a three-phase interlocking device for a DC to AC converter (DAC). The interlocking device includes a first interlocking circuit and a second interlocking circuit. The first interlocking circuit couples with a first switch and a second switch, controls whether to conduct the first switch according to the logic levels of a first signal, a second signal and a third signal, and controls whether to conduct the second switch according to the logic levels of the first signal and the second signal. The second interlocking circuit couples with a third switch and a fourth switch, controls whether to conduct the third switch according to the logic levels of the first signal, the third signal and a fourth signal, and controls whether to turn on the fourth switch according to the logic levels of the third signal and the fourth signal.

22 Claims, 8 Drawing Sheets

(56) References Cited

U.S. PATENT DOCUMENTS

| | | | | |
|---|---|---|---|---|
| 4,635,177 | A * | 1/1987 | Shekhawat | H02M 7/797 363/132 |
| 4,670,828 | A * | 6/1987 | Shekhawat | H02M 7/487 363/132 |
| 5,892,673 | A * | 4/1999 | Delgado | H02M 7/538 363/138 |
| 8,330,490 | B2 | 12/2012 | Lee et al. | |
| 8,942,019 | B2 * | 1/2015 | Shekhawat | H02M 7/487 363/131 |
| 2009/0244936 | A1 | 10/2009 | Falk et al. | |
| 2011/0316585 | A1 | 12/2011 | Lee et al. | |
| 2012/0243273 | A1 | 9/2012 | Rasoanarivo | |
| 2012/0287545 | A1 * | 11/2012 | Tran | H02M 1/38 361/101 |
| 2013/0015881 | A1 | 1/2013 | Lee et al. | |
| 2014/0240020 | A1 * | 8/2014 | Kris | H02M 1/08 327/241 |
| 2015/0155796 | A1 * | 6/2015 | Hsieh | H02M 7/487 363/131 |

OTHER PUBLICATIONS

Stefanos Saridakis et al., Optimal Design of Modern Transformerless PV Inverter Topologies, IEEE Transactions on Energy Conversion, 2013, p. 394-404, vol. 28, No. 2.

Stanley E. Schuster et al., Low-Power Synchronous-to-Asynchronous-to-Synchronous Interlocked Pipelined CMOS Circuits Operating at 3.3-4.5 GHz, IEEE Journal of Solid-State Circuits, 2003, p. 622-630, vol. 38, No. 4.

G. P. Hutchinson V.R.D., A.M.C.T., Interlocking in large electricity-supply substations-a fundamental approach, Proc. IEE, 1966, p. 1063-1074, vol. 113, No. 6.

B.P.Muni et al., Gating and Protection of IGBT in an Inverter, IECON'91, 1991 IEEE, p. 662-667.

Stanley Schuster et al., Asynchronous Interlocked Pipelined CMOS Circuits Operating at 3.3-4.5GHz., IEEE International Solid-State Circuits Conference, 2000, 07803-5853-8/00.

* cited by examiner

INTERLOCKING DEVICE AND THREE-PHASE INTERLOCKING DEVICE FOR DC TO AC CONVERTER

CROSS-REFERENCE TO RELATED APPLICATIONS

This non-provisional application claims priority under 35 U.S.C. §119(a) on Patent Application No(s). 102143884 filed in Taiwan, R.O.C. on Nov. 29, 2013, the entire contents of which are hereby incorporated by reference.

TECHNICAL FIELD

The disclosure relates to an interlocking device and a three-phase interlocking device for a DC to AC converter (DAC).

BACKGROUND

Generally, a neutral-point-clamped (NPC) DAC can be applied to distributed energy or renewable energy and can convert DC power into usable AC power. Because the power stage of the NPC DAC supplied with a high DC input voltage can employ low-voltage switching devices, the power loss of the switching devices can be reduced. Moreover, the NPC DAC has a low electromagnetic interference (EMI) and a low voltage harmonic distortion. Therefore, the NPC DAC has been widely applied to renewable power converter products recently.

The NPC DAC supplied with a high DC input voltage converts DC power into AC power by turning on or off switching devices, and malfunctions or noises may occur on the switching devices because the switching devices are being switched. This will cause short circuits in the DC end which will damage the switching devices.

SUMMARY

The disclosure provides a high level triggered interlocking device of a DAC according to one of the embodiments. The interlocking device includes a first interlocking circuit and a second interlocking circuit. The first interlocking circuit couples with a first switch and a second switch, and receives a first signal, a second signal and a third signal. The first interlocking circuit generates a first locking signal for controlling whether to turn on the first switch according to logic levels of the first signal, the second signal, and the third signal, and generates a second locking signal for controlling whether to turn on the second switch according to the logic levels of the first signal and the second signal. The second interlocking circuit couples with a third switch and a fourth switch, and receives the first signal, the third signal, and a fourth signal. The second interlocking circuit generates a third locking signal for controlling whether to turn on the third switch according to the logic levels of the first signal and the third signal and a logic level of the fourth signal, and generates a fourth locking signal for controlling whether to turn on the fourth switch according to the logic levels of the third signal and the fourth signal.

The disclosure provides a three-phase interlocking device which includes three aforementioned high level triggered interlocking devices and is adapted to a three-phase DAC according to one of the embodiments. The three-phase DAC includes three switch sets each of which includes the aforementioned first switch, the aforementioned second switch, the aforementioned third switch, and the aforementioned fourth switch. The three aforementioned interlocking devices respectively correspond to the three switch sets. Each of the three switch sets interlocks the corresponding switch set according to a signal set. The phase difference associated with the three signal sets is 120 degrees. Each of the three signal sets includes the aforementioned first signal, the aforementioned second signal, the aforementioned third signal, and the aforementioned fourth signal.

The disclosure provides a low level triggered interlocking device of a DAC according to one of the embodiments. The interlocking device includes a third interlocking circuit and a fourth interlocking circuit. The third interlocking circuit couples with a first switch and a second switch, and receives a fifth signal, a sixth signal, and an eighth signal. The third interlocking circuit generates a fifth locking signal for controlling whether to turn on the first switch according to logic levels of the fifth signal, the sixth signal, and the eighth signal, and generates a sixth locking signal for controlling whether to turn on the second switch according to the logic levels of the fifth signal and the sixth signal. The fourth interlocking circuit couples with a third switch and a fourth switch, and receives the sixth signal, a seventh signal, and the eighth signal. The fourth interlocking circuit generates a seventh locking signal for controlling whether to turn on the third switch according to the logic levels of the sixth signal and the eighth signal and a logic level of the seventh signal, and generates an eighth locking signal for controlling whether to turn on the fourth switch according to the logic levels of the seventh signal and the eighth signal.

The disclosure provides a three-phase interlocking device which includes three aforementioned low level triggered interlocking devices according to one of the embodiments and is adapted to a three-phase DAC which includes three switch sets each of which includes the aforementioned first switch, the aforementioned second switch, the aforementioned third switch, and the aforementioned fourth switch. The three interlocking devices respectively correspond to the three switch sets, and each of the three switch sets interlocks the corresponding switch set according to a signal set. The phase different associated with the three signal sets is 120 degrees. Each of the three signal sets includes the aforementioned fifth signal, the aforementioned sixth signal, the aforementioned seventh signal, and the aforementioned eighth signal.

BRIEF DESCRIPTION OF THE DRAWINGS

The present disclosure will be more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides various exemplary embodiments and uses the same label to represent the same or similar elements.

Figure 1:
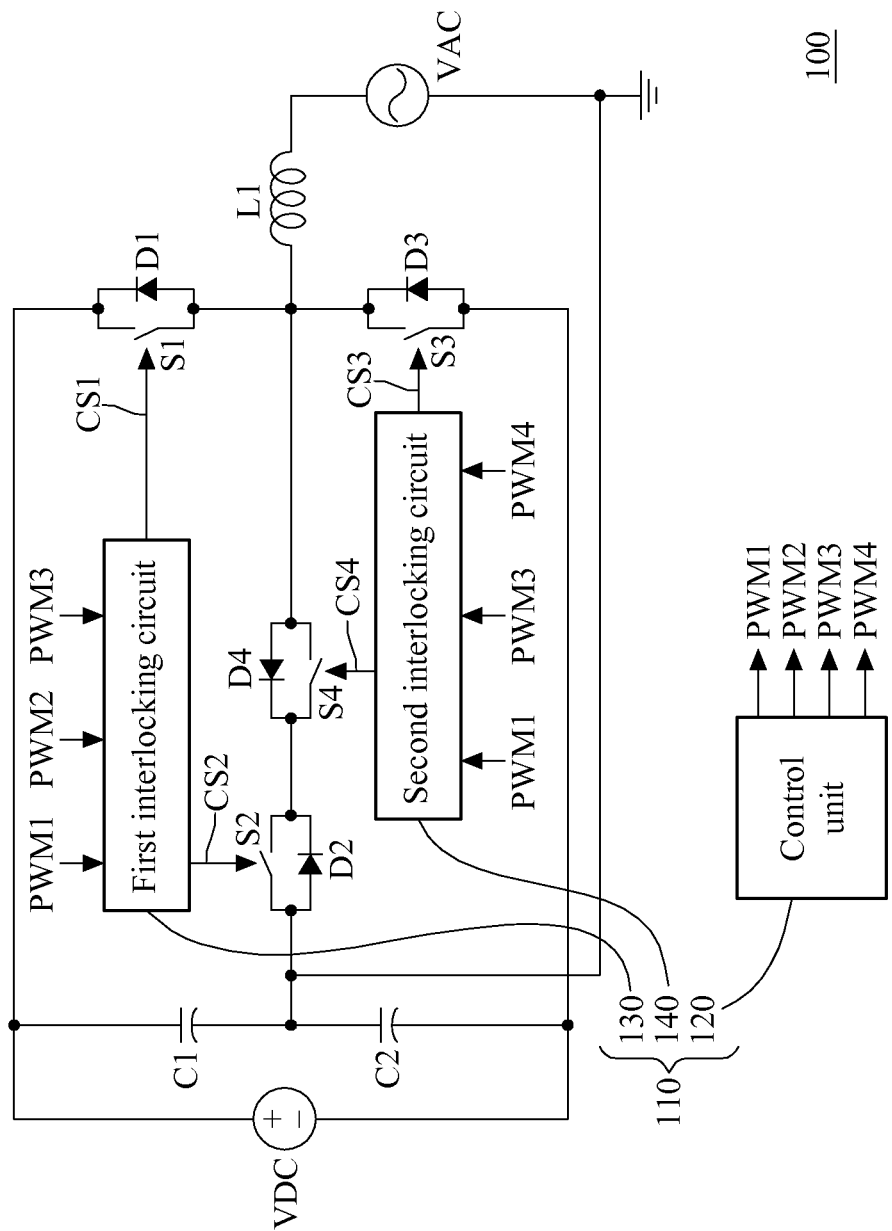
FIG. 1 is a schematic view of a first embodiment of a DAC in the disclosure.

FIG. 1 is a schematic view of a first embodiment of a DAC in the disclosure. The DAC 100 includes a DC power source VDC, an AC power source VAC, capacitors C1 and C2, an inductor L1, diodes D1, D2, D3 and D4, a first switch S1, a second switch S2, a third switch S3, a fourth switch S4 and an interlocking device 110. The connections among the DC power source VDC, the AC power source VAC, the capacitors C1 and C2, the inductor L1, the diodes D1, D2, D3 and D4, the first switch S1, the second switch S2, the third switch S3, the fourth switch S4 are shown in FIG. 1 and thus not described again hereinafter. The DAC 100 can be, for example but not limited to, a NPC DAC.

The interlocking device 110 includes a control unit 120, a first interlocking circuit 130 and a second interlocking circuit 140. The control unit 120 generates a first signal PWM1, a second signal PWM2, a third signal PWM3 and a fourth signal PWM4. The first signal PWM1, the second signal PWM2, the third signal PWM3 and the fourth signal PWM4 can be, for example, pulse width modulation (PWM) signals.

The first interlocking circuit 130 couples with the first switch S1 and the second switch S2, and receives the first signal PWM1, the second signal PWM2 and the third signal PWM3. The first interlocking circuit 130 generates a first locking signal CS1 for controlling whether to turn on (or conduct) the first switch S1 according to logic levels of the first signal PWM1, the second signal PWM2, and the third signal PWM3. Also, the first interlocking circuit 130 generates a second locking signal CS2 for controlling whether to turn on the second switch S2 according to the logic levels of the first signal PWM1 and the second signal PWM2.

The second interlocking circuit 140 couples with the third switch S3 and the fourth switch S4, and receives the first signal PWM1, the third signal PWM3 and the fourth signal PWM4. The second interlocking circuit 140, according to the logic levels of the first signal PWM1, the third signal PWM3, and the fourth signal PWM4, generates a third locking signal CS3 for controlling whether to turn on the third switch S3. Also, the second interlocking circuit 140, according to the logic levels of the third signal PWM3 and the fourth signal PWM4, generates a fourth locking signal CS4 for controlling whether to turn on the fourth switch S4.

Generally, when the control unit 120 operates normally, the first signal PWM1 and the second signal PWM2 complement each other, and the third signal PWM3 and the fourth signal PWM4 complement each other. Thus, the first signal PWM1 and the second signal PWM2 have to be interlocked, the third signal PWM3 and the fourth signal PWM4 have to be interlocked, and the first signal PWM1 and the third signal PWM3 have to be interlocked. In this way, the first interlocking circuit 130 and the second interlocking circuit 140 can sequentially turn on the first switch S1, the second switch S2, the fourth switch S4 and the third switch S3 so as to ensure that the DAC 100 can operate normally.

In contrast, if the control unit 120 has errors or malfunctions, the first signal PWM1, the second signal PWM2, the third signal PWM3 and the fourth signal PWM4 will become abnormal. If these PWM signals become abnormal, the interlocking of the DAC 100 employing the first interlocking circuit 130 and the second interlocking circuit 140 will be performed as follows.

In one of exemplary embodiments, if the first signal PWM1 and the second signal PWM2 are at a high logic level, the first interlocking circuit 130 will generate the first locking signal CS1 and the second locking signal CS2 which are, for example, at a low logic level, to respectively turn off the first switch S1 and the second switch S2. In this way, the capacitor C1, the first switch S1, the diode D4 and the second switch S2 can be prevented from forming a short circuitry loop which is caused due to malfunctions and will damage circuits.

In one of exemplary embodiments, if the first signal PWM1 and the third signal PWM3 are at a high logic level, the first interlocking circuit 130 will generate the first locking signal CS1, which is, for example, at a low logic level to turn off the first switch S1. In this way, the capacitors C1 and C2, the first switch S1 and the third switch S3 can be prevented from forming a short circuitry loop which is caused due to malfunctions and will damage circuits.

In one of exemplary embodiments, if the first signal PWM1, the second signal PWM2 and the third signal PWM3 are at a high logic level, the first interlocking circuit 130 will generate the first locking signal CS1 and the second locking signal CS2, both of which are, for example, at a low logic level to turn off the first switch S1 and the second switch S2 respectively. Thus, the capacitor C1, the first switch S1, the diode D4 and the second switch S2 can be prevented from forming a first short circuit loop, and the capacitors C1 and C2, the first switch S1 and the third switch S3 can be prevented from forming a second short circuit, where the first short circuit loop and the second short circuit loop will damage circuits due to malfunctions.

In one of exemplary embodiments, if the third signal PWM3 and the fourth signal PWM4 are at a high logic level, the second interlocking circuit 140 will generate the third locking signal CS3 and the fourth locking signal CS4, both of which are, for example, at a low logic level to turn off the third switch S3 and the fourth switch S4 respectively. Thus, the capacitor C2, the diode D2, the fourth switch S4 and the third switch S3 can be prevented from forming a short circuitry loop which is caused due to malfunctions and will damage circuits.

In one of exemplary embodiments, if the first signal PWM1, the third signal PWM3 and the fourth signal PWM4 are at a high logic level, the second interlocking circuit 140 will generate the third locking signal CS3 and the fourth locking signal CS4, both of which are, for example, at a low logic level to turn off the third switch S3 and the fourth switch S4 respectively. Thus, the capacitor C2, the diode D2, the fourth switch S4 and the third switch S3 can be prevented from forming a first short circuit loop, and the capacitors C1 and C2, the first switch S1 and the third switch S3 can be prevented from forming a second short circuit loop, where the two short circuit loops will damage circuits due to malfunctions.

In one of exemplary embodiments, if the first signal PWM1, the second signal PWM2, the third signal PWM3 and the fourth signal PWM4 are at a high logic level, the first interlocking circuit 130 will generate the first locking signal CS1 and the second locking signal CS2, both of which are, for example, at a low logic level to turn off the first switch S1 and the second switch S2 respectively, and meanwhile the second interlocking circuit 140 will generate the third locking signal CS3 and the fourth locking signal CS4, both of which are, for example, at a low logic level to turn off the third switch S3 and the fourth switch S4 respectively. Thus, the capacitor C1, the first switch S1, the diode D4 and the second switch S2 can be prevented from forming a first short circuit loop, the capacitor C2, the diode D2, the fourth switch S4 and the third switch S3 can be prevented from forming a second short circuit loop, and the capacitors C1 and C2, the first switch S1 and the third switch S3 can be prevented from forming a third short circuit loop, where these short circuit loops will damage circuits due to malfunctions.

Figure 2:
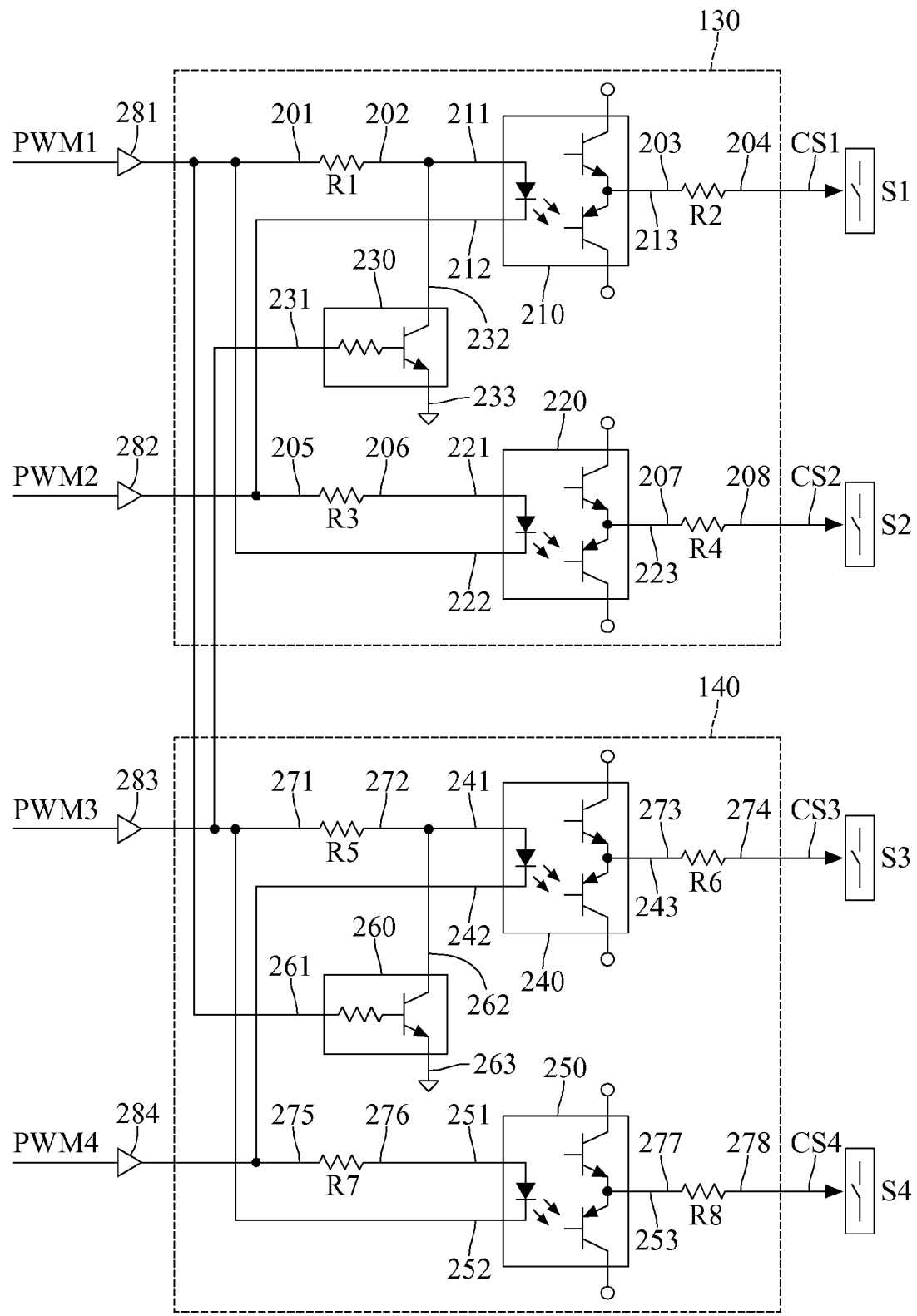
FIG. 2 is a schematic view of the first interlocking circuit and the second interlocking circuit in FIG. 1.

FIG. 2 is a schematic view of the first interlocking circuit and the second interlocking circuit in FIG. 1. The first interlocking circuit 130 includes a first resistor R1, a first locking unit 210, a second resistor R2, a third resistor R3, a second locking unit 220, a fourth resistor R4 and a first control unit 230. The first resistor R1 has a first end 201 for receiving the first signal PWM1, and a second end 202.

The first locking unit 210 has a first end 211, a second end 212 and a third end 213. The first end 211 of the first locking unit 210 couples with the second end 202 of the first resistor R1, and the second end 212 of the first locking unit 210 receives the second signal PWM2. The second resistor R2 has a first end 203 and a second end 204. The first end 203 of the second resistor R2 couples with the third end 213 of the first locking unit 210, and the second end 204 of the second resistor R2 couples with the first switch S1. The third resistor R3 has a first end 205 and a second end 206, and the first end 205 of the third resistor R3 receives the second signal PWM2.

The second locking unit 220 has a first end 221, a second end 222 and a third end 223. The first end 221 of the second locking unit 220 couples with the second end 206 of the third resistor R3, and the second end 222 of the second locking unit 220 receives the first signal PWM1. The fourth resistor R4 has a first end 207 and a second end 208. The first end 207 of the fourth resistor R4 couples with the third end 223 of the second locking unit 220, and the second end 208 of the fourth resistor R4 couples with the second switch S2.

In one of exemplary embodiment, the first locking unit 210 and the second locking unit 220 are, for example, photocouplers, and each of the first locking unit 210 and the second locking unit 220 includes a light emitting diode (LED), a NPN transistor and a PNP transistor. The connections associated with the diode, the NPN transistor and the PNP transistor in the first locking unit 210 and in the second locking unit 220 are shown in FIG. 2. In the first locking unit 210, the anode and cathode of the LED couple with the first end 211 and the second end 212 of the first locking unit 210 respectively, and a common node connecting the NPN transistor and the PNP transistor couples with the third end 213 of the first locking unit 210. In the second locking unit 220, the anode and cathode of the LED couple with the first end 221 and the second end 222 of the second locking unit 220 respectively, and a common node connecting the NPN transistor and the PNP transistor couples with the third end 223 of the second locking unit 220.

The first control unit 230 has a first end 231, a second end 232 and a third end 233. The first end 231 of the first control unit 230 receives the third signal PWM3, the second end 232 of the first control unit 230 couples with the second end 202 of the first resistor R1, and the third end 233 of the first control unit 230 is grounded. In this embodiment, the first control unit 230 includes a resistor and a NPN transistor, and the connections associated with the resistor and the NPN transistor are shown in FIG. 2 and thus not described again hereinafter. In the first control unit 230, one end of the resistor couples with the first end 231 of the first control unit 230, and the collector end and emitter end of the NPN transistor respectively couple with the second end 232 and the third end 233 of the first control unit 230.

The second interlocking circuit 140 includes a fifth resistor R5, a third locking unit 240, a sixth resistor R6, a seventh resistor R7, a fourth locking unit 250, an eighth resistor R8 and a second control unit 260. The fifth resistor R5 has a first end 271 and a second end 272, and the first end 271 of the fifth resistor R5 receives the third signal PWM3. The third locking unit 240 has a first end 241, a second end 242 and a third end 243. The first end 241 of the third locking unit 240 couples with the second end 272 of the fifth resistor R5, and the second end 242 of the third locking unit 240 receives the fourth signal PWM4. The sixth resistor R6 has a first end 273 and a second end 274. The first end 273 of the sixth resistor R6 couples with the third end 243 of the third locking unit 240, and the second end 274 of the sixth resistor R6 couples with the third switch S3. The seventh resistor R7 has a first end 275 and a second end 276, and the first end 275 of the seventh resistor R7 receives the fourth signal PWM4.

The fourth locking unit 250 has a first end 251, a second end 252 and a third end 253. The first end 251 of the fourth locking unit 250 couples with the second end 276 of the seventh resistor R7, and the second end 252 of the fourth locking unit 250 receives the third signal PWM3. The eighth resistor R8 has a first end 277 and a second end 278. The first end 277 of the eighth resistor R8 couples with the third end 253 of the fourth locking unit 250, and the second end 278 of the eighth resistor R8 couples with the fourth switch S4.

In one of exemplary embodiments, the third locking unit 240 and the fourth locking unit 250 are, for example, photocouplers, and each of the third locking unit 240 and the fourth locking unit 250 includes a LED, a NPN transistor and a PNP transistor. The connections associated with the LED, NPN transistor and PNP transistor in the third locking unit 240 and in the fourth locking unit 250 are shown in FIG. 2. In the third locking unit 240, the anode and cathode of the LED couple with the first end 241 and the second end 242 of the third locking unit 240 respectively, and a common node connecting to the NPN transistor and the PNP transistor couples with the third end 243 of the third locking unit 240. In the fourth locking unit 250, the anode and cathode of the LED couple with the first end 251 and the second end 252 of the fourth locking unit 250 respectively, and a common node connecting to the NPN transistor and the PNP transistor couples with the third end 253 of the fourth locking unit 250.

The second control unit 260 has a first end 261, a second end 262 and a third end 263. The first end 261 of the second control unit 260 receives the first signal PWM1, the second end 262 of the second control unit 260 couples with the second end 272 of the fifth resistor R5, and the third end 263 of the second control unit 260 is grounded.

In one of exemplary embodiments, the second control unit 260 includes a resistor and a NPN transistor, and the connections, associated with the resistor and the NPN transistor, are shown in FIG. 2. In the second control unit 260, one end of the resistor couples with the first end 261 of the second control unit 260, and the collector end and emitter end of the NPN transistor couple with the second end 262 and the third end 263 of the second control unit 260 respectively.

Moreover, the interlocking device 100 further includes a first buffer 281, a second buffer 282, a third buffer 283 and a fourth buffer 284. The first buffer 281 couples with a transmission path for the first signal PWM1, and increases the gain of the first signal PWM1. The second buffer 282 couples with a transmission path for the second signal PWM2, and increases the gain of the second signal PWM2. The third buffer 283 couples with a transmission path for the third signal PWM3, and increases the gain of the third signal PWM3. The fourth buffer 284 couples with a transmission path for the fourth signal PWM4, and increases the gain of the fourth signal PWM4.

The aforementioned simple description is related to the internal components and related connections of the first interlocking circuit 130 and the second interlocking circuit 140, and the interlocking of the DAC 100 employing the first interlocking circuit 130 and the second interlocking circuit 140 is described below.

In one of exemplary embodiments, assume that the first signal PWM1 and the second signal PWM2 are at a high logic level and the first signal PWM1 and the second signal PWM2 are respectively transmitted to the first end 211 and the second end 212 of the first locking unit 210 respectively and to the first end 221 and the second end 222 of the second locking unit 220 respectively. Because the first signal PWM1 and the second signal PWM2 received by the first locking unit 210 are at a high logic level, the LED in the first locking unit 210 will not be conducted. Herein, the third end (i.e. an output end) 213 of the first locking unit 210 outputs the first locking signal CS1 at a low logic level via the second resistor R2, and then the first switch S1 is turned off. Meanwhile, because the second signal PWM2 and the first signal PWM1 received by the second locking unit 220 are at a high logic level, the LED in the second locking unit 220 will not be conducted. Herein, the third end (i.e. an output end) 223 of the second locking unit 220 outputs the second locking signal CS2 at a low logic level via the fourth resistor R4, and then the second switch S2 is turned off. Thus, the capacitor C1, the first switch S1, the diode D4 and the second switch S2 in FIG. 1 will not result in a short circuit loop which is caused due to malfunctions and will damage circuits.

In one of exemplary embodiments, assume that the first signal PWM1 and the third signal PWM3 are at a high logic level and the third signal PWM3 is transmitted to the first end 231 of the first control unit 230. Because the third signal PWM3 received by the base end of the NPN transistor through the resistor in the first control unit 230 is at a high logic level, the NPN transistor in the first control unit 230 will be conducted. Herein, the second end 232 of the first control unit 230 is grounded through the third end 233, and then the second end 232 of the first control unit 230 outputs a signal at a low logic level to the first end 211 of the first locking unit 210. Meanwhile, because the signal received by the first end 211 of the first locking unit 210 is at a low logic level, the LED in the first locking unit 210 will not be conducted. Herein, the third end 213 of the first locking unit 210 outputs the first locking signal CS1 at a low logic level through the second resistor R2, and then the first switch S1 is turned off. Thus, the capacitors C1 and C2, the first switch S1 and the third switch S3 in FIG. 1 will not result in a short circuit loop which is caused due to malfunctions and will damage circuits.

In one of exemplary embodiments, assume that the first signal PWM1, the second signal PWM2 and the third signal PWM3 are at a high logic level, the first signal PWM1 and the second signal PWM2 are transmitted to the first end 211 and the second end 212 of the first locking unit 210 respectively and to the first end 221 and the second end 222 of the second locking unit 220 respectively, and the third signal PWM3 is transmitted to the first end 231 of the first control unit 230. Because the first signal PWM1 and the second signal PWM2 received by the first locking unit 210 are at a high logic level, the LED in the first locking unit 210 will not be conducted. Herein, the third end 213 of the first locking unit 210 outputs the first locking signal CS1 at a low logic level through the second resistor R2, and then the first switch S1 is turned off. Meanwhile, because the second signal PWM2 and the first signal PWM1 received by the second locking unit 220 are at a high logic level, the LED in the second locking unit 220 will not be conducted. Herein, the third end 223 of the second locking unit 220 outputs the second locking signal CS2 at a low logic level through the fourth resistor R4, and the second switch S2 is turned off. Meanwhile, because the third signal PWM3 received by the base end of the NPN transistor through the resistor in the first control unit 230 is at a high logic level, the NPN transistor in the first control unit 230 will be conducted and the LED in the first locking unit 210 will not be conducted. Herein, the third end 213 of the first locking unit 210 outputs the first locking signal CS1 at a low logic level through the second resistor R2, and then the first switch S1 is turned off. Thus, the capacitor C1, the first switch S1, the diode D4 and the second switch S2 in FIG. 1 will not result in a first short circuit loop, and the capacitors C1 and C2, the first switch S1 and the third switch S3 in FIG. 1 will not lead to a second short circuit loop, where these short circuit loops will damage circuits due to malfunctions.

In one of exemplary embodiments, assume that the third signal PWM3 and the fourth signal PWM4 are at a high logic level, and are transmitted to the first end 241 and the second end 242 of the third locking unit 240 respectively and to the first end 251 and the second end 252 of the fourth locking unit 250 respectively. Because the third signal PWM3 and the fourth signal PWM4 received by the third locking unit 240 are at a high logic level, the LED in the third locking unit 240 will not be conducted. Herein, the third end (i.e. an output end) 243 of the third locking unit 240 outputs the third locking signal CS3 at a low logic level through the sixth resistor R6, and then the third switch S3 is turned off. Meanwhile, because the fourth signal PWM4 and the third signal PWM3 received by the fourth locking unit 250 are at a high logic level, the LED in the fourth locking unit 250 will not be conducted. Herein, the third end (i.e. an output end) 253 of the fourth locking unit 250 outputs the fourth locking signal CS4 at a low logic level through the eighth resistor R8, and then the fourth switch S4 is turned off. Thus, the capacitor C2, the diode D2, the fourth switch S4 and the third switch S3 will not result in a short circuit loop which is caused due to malfunctions and will damage circuits.

In one of exemplary embodiments, assume that the first signal PWM1, the third signal PWM3 and the fourth signal PWM4 are at a high logic level, the third signal PWM3 and the fourth signal PWM4 are transmitted to the first end 241 and the second end 242 of the third locking unit 240 respectively and to the first end 251 and the second end 252 of the fourth locking unit 250 respectively, and the first signal PWM1 is transmitted to the first end 261 of the second control unit 260. Because the third signal PWM3 and the fourth signal PWM4 received by the third locking unit 240 are at a high logic level, the LED in the third locking unit 240 will not be conducted. Herein, the third end 243 of the third locking unit 240 outputs the third locking signal CS3 at a low logic level through the sixth resistor R6, and then the third switch S3 is turned off. Meanwhile, because the fourth signal PWM4 and the third signal PWM3 received by the fourth locking unit 250 are at a high logic level, the LED in the fourth locking unit 250 will not be conducted. Herein, the third end 253 of the fourth locking unit 250 outputs the fourth locking signal CS4 at a low logic level through the eighth resistor R8, and the fourth switch S4 is turned off. Moreover, because the first signal PWM1 received by the base end of the NPN transistor in the second control unit 260 through the resistor is at a high logic level, the NPN transistor in the second control unit 260 will be conducted and the LED in the third locking unit 240 will not be conducted. Herein, the third end 243 of the third locking unit 240 outputs the third locking signal CS3 at a low logic level through the sixth resistor R6, and then the third switch S3 is turned off. Thus, the capacitor C2, the diode D2, the fourth switch S4 and the third switch S3 in FIG. 1 will not result in a first short circuit loop, and the capacitors C1 and C2, the first switch S1 and the third switch S3 in FIG. 1 will not lead to a second short circuit loop, where these short circuit loops will damage circuits due to malfunctions.

In one of exemplary embodiments, assume that the first signal PWM1, the second signal PWM2, the third signal PWM3 and the fourth signal PWM4 are at a high logic level, the first signal PWM1 and the second signal PWM2 are transmitted to the first end 211 and the second end 212 of the first locking unit 210 respectively and to the first end 221 and the second end 222 of the second locking unit 220 respectively, and the third signal PWM3 and the fourth signal PWM4 are transmitted to the first end 241 and the second end 242 of the third locking unit 240 respectively and to the first end 251 and the second end 252 of the fourth locking unit 250 respectively.

Because the first signal PWM1 and the second signal PWM2 received by the first locking unit 210 are at a high logic level, the LED in the first locking unit 210 will not be conducted. Herein, the third end 213 of the first locking unit 210 outputs the first locking signal CS1 at a low logic level through the second resistor R2, and then the first switch S1 is turned off. Meanwhile, because the second signal PWM2 and the first signal PWM1 received by the second locking unit 220 are at a high logic level, the LED in the second locking unit 220 will not be conducted. Herein, the third end 223 of the second locking unit 220 outputs the second locking signal CS2 at a low logic level through the fourth resistor R4, and the second switch S2 is turned off. Because the third signal PWM3 and the fourth signal PWM4 received by the third locking unit 240 are at a high logic level, the LED in the third locking unit 240 will not be conducted. Herein, the third end 243 of the third locking unit 240 outputs the third locking signal CS3 at a low logic level through the sixth resistor R6, and then the third switch S3 is turned off. Moreover, because the fourth signal PWM4 and the third signal PWM3 received by the fourth locking unit 250 are at a high logic level, the LED in the fourth locking unit 250 will not be conducted. Herein, the third end 253 of the fourth locking unit 250 outputs the fourth locking signal CS4 at a low logic level through the eighth resistor R8, and then the fourth switch S4 is turned off. In this way, the capacitor C1, the first switch S1, the diode D4 and the second switch S2 will not result in a first short circuit loop, the capacitor C2, the diode D2, the fourth switch S4 and the third switch S3 will not result in a second short circuit loop, and the capacitors C1 and C2, the first switch S1 and the third switch S3 will not result in a third short circuit loop, where these short circuit loops will damage circuits due to malfunctions.

In the aforementioned embodiments, the DAC 100 is a single-phase DAC, and however, the disclosure will not be limited thereto. Other exemplary embodiments are described below.

Figure 3A:
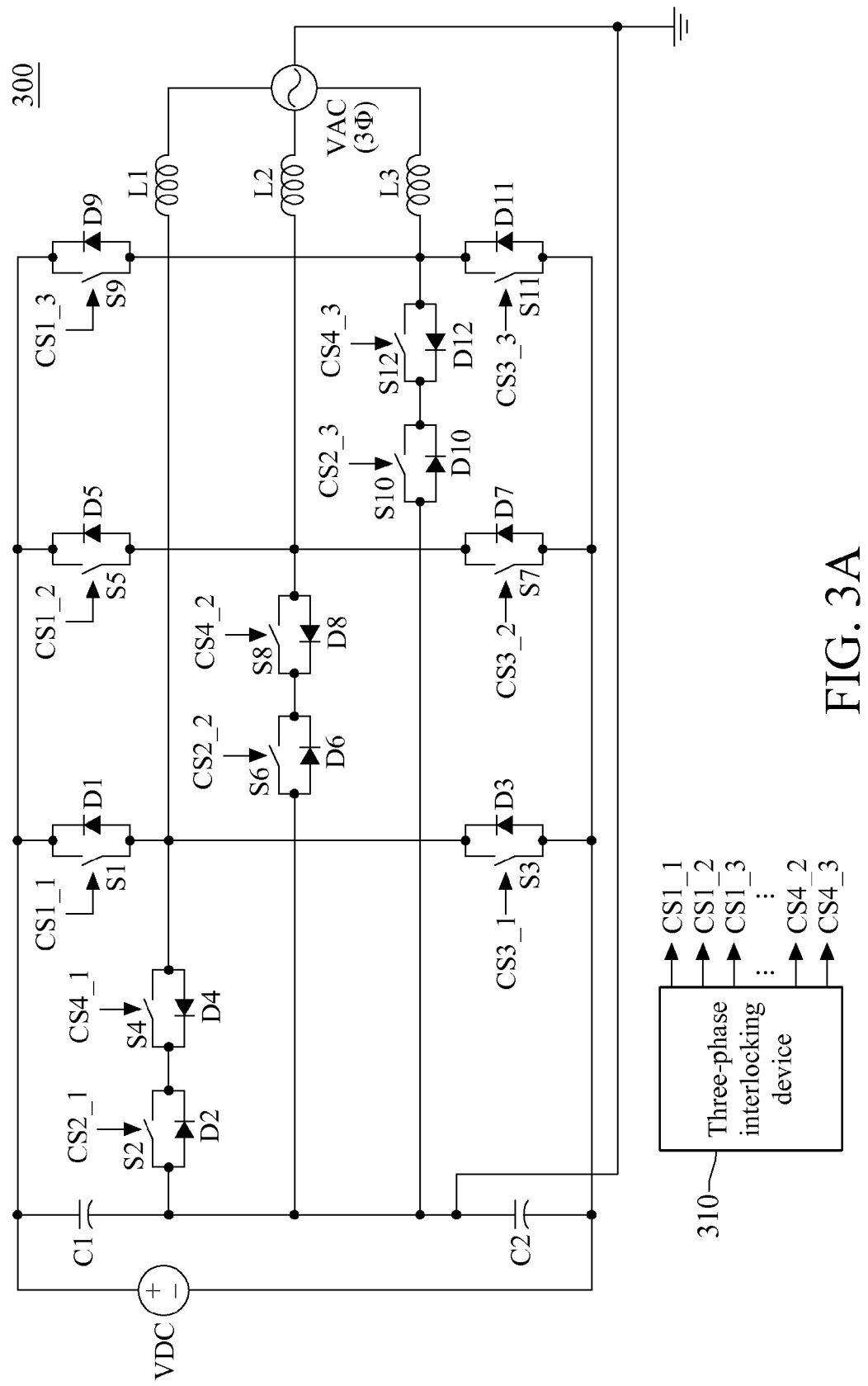
FIG. 3A is a schematic view of a second embodiment of a three-phase DAC in the disclosure.
Figure 3B:
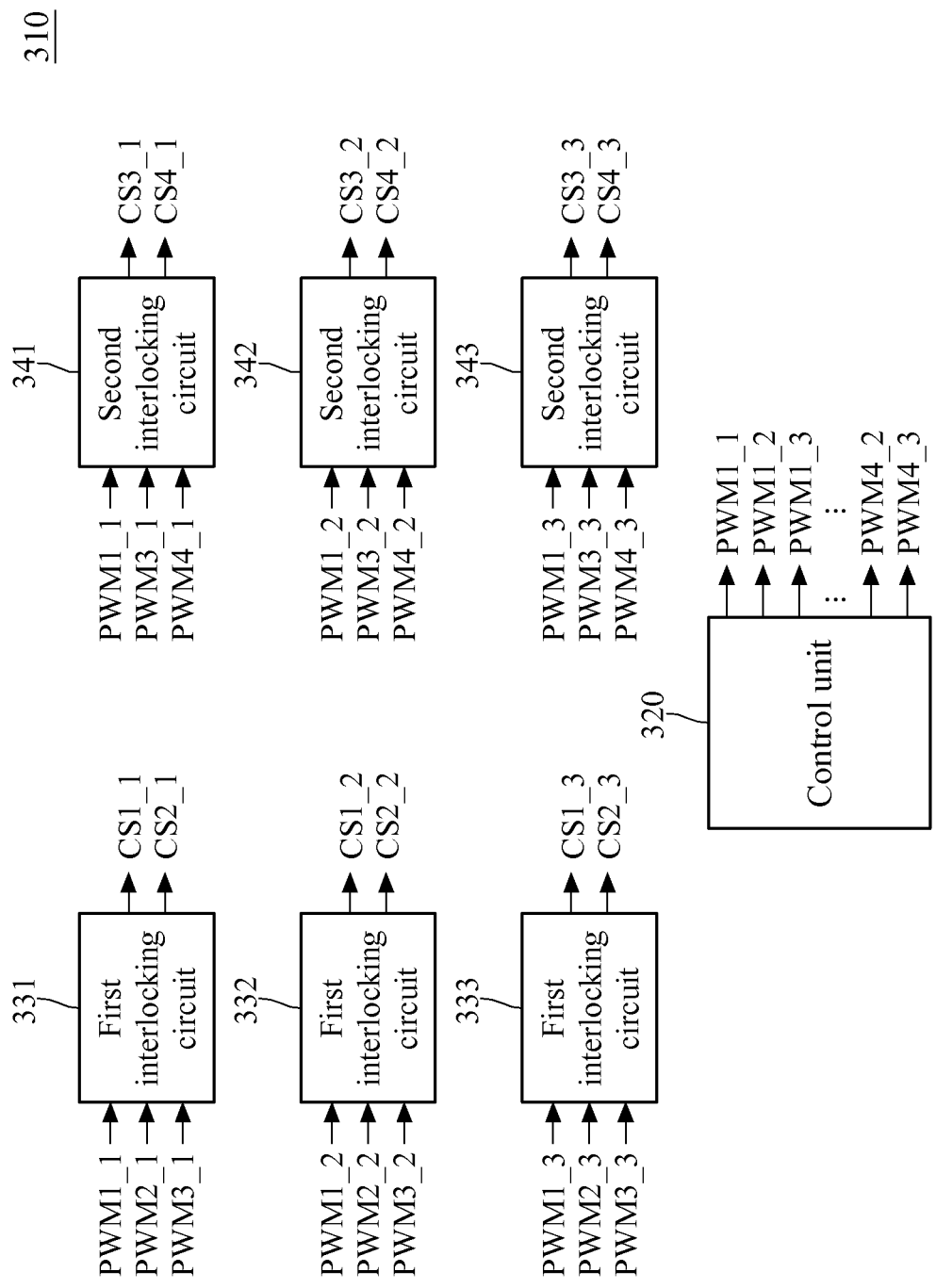
FIG. 3B is a schematic view of the three-phase interlocking device in FIG. 3A.

FIG. 3A is a schematic view of a second embodiment of a three-phase DAC in the disclosure, and FIG. 3B is a schematic view of the three-phase interlocking device in FIG. 3A. The three-phase DAC 300 includes a DC power source VDC, a three-phase AC power source VAC (3Φ), capacitors C1 and C2, inductors L1, L2 and L3, diodes D1 D2, D3, D4, D5, D6, D7, D8, D9, D10, D11 and D12, a first switch S1, a second switch S2, a third switch S3, a fourth switch S4, a fifth switch S5, a sixth switch S6, a seventh switch S7, an eighth switch S8, a ninth switch S9, a tenth switch S10, an eleventh switch S11, a twelfth switch S12 and a three-phase interlocking device 310. The connections among the DC power source VDC, the three-phase AC power source VAC(3Φ), the capacitors C1 and C2, the inductors L1, L2 and L3, the diodes D1, D2, D3, D4, D5, D6, D7, D8, D9, D10, D11 and D12, the first switch S1, the second switch S2, the third switch S3, the fourth switch S4, the fifth switch S5, the sixth switch S6, the seventh switch S7, the eighth switch S8, the ninth switch S9, the tenth switch S10, the eleventh switch S11 and the twelfth switch S12 are shown in FIG. 3A and not described again hereinafter.

The three-phase interlocking device 310 includes a control unit 320, first interlocking circuits 331 332 and 333 and second interlocking circuits 341, 342 and 343 are shown in FIG. 3B. The control unit 320 generates first signals PWM1_1, PWM1_2 and PWM1_3, second signals PWM2_1, PWM2_2 and PWM2_3, third signals PWM3_1, PWM3_2 and PWM3_3, and fourth signals PWM4_1, PWM4_2 and PWM4_3. In one of exemplary embodiments, the phase difference between any two of the first signals PWM1_1, PWM1_2 and PWM1_3 is 120 degrees, the phase difference between any two of the second signals PWM2_1, PWM2_2 and PWM2_3 is 120 degrees, the phase difference between any two of the third signals PWM3_1, PWM3_2 and PWM3_3 is 120 degrees, and the phase difference between any two of the fourth signals PWM4_1, PWM4_2 and PWM4_3 is 120 degrees.

The first interlocking circuit 331 couples with the first switch S1 and the second switch S2, and receives the first signal PWM1_1, the second signal PWM2_1 and the third signal PWM3_1. The first interlocking circuit 331 generates a first locking signal CS1_1 for controlling whether to turn on the first switch S1 according to the logic levels of the first signal PWM1_1, the second signal PWM2_1 and the third signal PWM3_1, and generates a second locking signal CS2_1 for controlling whether to turn on the second switch S2 according to the logic levels of the first signal PWM1_1 and the second signal PWM2_1.

The second interlocking circuit 341 couples with the third switch S3 and the fourth switch S4, and receives the first signal PWM1_1, the third signal PWM3_1 and the fourth signal PWM4_1. The second interlocking circuit 341 generates a third locking signal CS3_1 for controlling whether to turn on the third switch S3 according to the logic levels of the first signal PWM1_1, the third signal PWM3_1 and the fourth signal PWM4_1, and generates a fourth locking signal CS4_1 for controlling whether to turn on the fourth switch S4 according to the logic levels of the third signal PWM3_1 and the fourth signal PWM4_1.

The first interlocking circuit 332 couples with the fifth switch S5 and the sixth switch S6, and receives the first signal PWM1_2, the second signal PWM2_2 and the third signal PWM3_2. The first interlocking circuit 332 generates a first locking signal CS1_2 for controlling whether to turn on the fifth switch S5 according to the logic levels of the first signal PWM1_2, the second signal PWM2_2 and the third signal PWM3_2, and generates a second locking signal CS2_2 for controlling whether to turn on the sixth switch S6 according to the logic levels of the first signal PWM1_2 and the second signal PWM2_2.

The second interlocking circuit 342 couples with the seventh switch S7 and the eighth switch S8, and receives the first signal PWM1_2, the third signal PWM3_2 and the fourth signal PWM4_2. The second interlocking circuit 342 generates a third locking signal CS3_2 for controlling whether to turn on the seventh switch S7 according to the logic levels of the first signal PWM1_2, the third signal PWM3_2 and the fourth signal PWM4_2, and generates a fourth locking signal CS4_2 for controlling whether to turn on the eighth switch S8 according to the logic levels of the third signal PWM3_2 and the fourth signal PWM4_2.

The first interlocking circuit 333 couples with the ninth switch S9 and the tenth switch S10, and receives the first signal PWM1_3, the second signal PWM2_3 and the third signal PWM3_3. The first interlocking circuit 333 generates a first locking signal CS1_3 for controlling whether to turn on the ninth switch S9 according to the logic levels of the first signal PWM1_3, the second signal PWM2_3 and the third signal PWM3_3, and generates a second locking signal CS2_3 for controlling whether to turn on the tenth switch S10 according to the logic levels of the first signal PWM1_3 and the second signal PWM2_3.

The second interlocking circuit 343 couples with the eleventh switch S11 and the twelfth switch S12, and receives the first signal PWM1_3, the third signal PWM3_3 and the fourth signal PWM4_3. The second interlocking circuit 343 generates a third locking signal CS3_3 for controlling whether to turn on the eleventh switch S11 according to the logic levels of the first signal PWM1_3, the third signal PWM3_3 and the fourth signal PWM4_3, and generates a fourth locking signal CS4_3 for controlling whether to turn on the twelfth switch S12 according to the logic levels of the third signal PWM3_3 and the fourth signal PWM4_3.

The operations of the first interlocking circuits 331, 332 and 333 and the second interlocking circuits 341, 342 and 343 can be referred to the operations of the first interlocking circuit 130 and the second interlocking circuit 140 in FIG. 1, and the internal components, related connections and related operations of the first interlocking circuits 331, 332 and 333, and the second interlocking circuits 341, 342 and 343 can be referred to those of the first interlocking circuit 130 and the second interlocking circuit 140 in FIG. 2, thereby being not described hereinafter. The three-phase DAC 300 employs the first interlocking circuits 331, 332 and 333 and the second interlocking circuits 341, 342 and 343 in the three-phase interlocking device 310, thereby being prevented from forming short circuits due to malfunctions, and enhancing the safety of circuit operation.

In view of the description related to FIG. 1, the first switch S1 to the fourth switch S4 are conducted because the first signal PWM1 to the fourth signal PWM4 are at a high logic level. In view of the description related to FIG. 3A and FIG. 3B, the first switch S1 to the twelfth switch S12 are conducted because the first signal PWM1_1 to the fourth signal PWM4_3 are at a high logic level. Accordingly, the interlocking device 110 in FIG. 1 belongs to a high level triggered one, and the three-phase interlocking device 310 in FIG. 3A and FIG. 3B belongs to a high level triggered one. However, the disclosure will not be limited thereto, and other exemplary embodiments will be described below.

Figure 4:
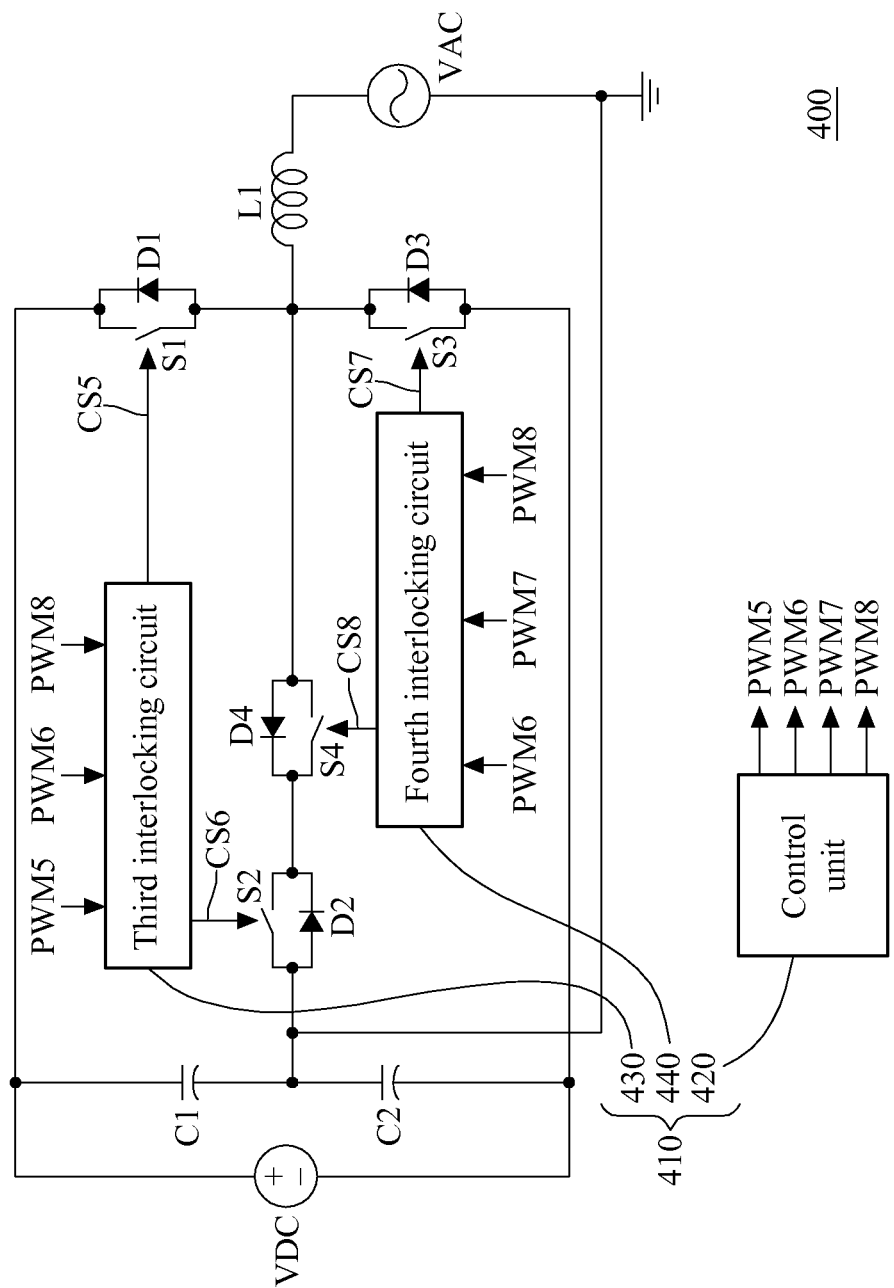
FIG. 4 is a schematic view of a third embodiment of a DAC in the disclosure.

FIG. 4 is a schematic view of a third embodiment of a DAC in the disclosure. The DAC 400 includes a DC power source VDC, an AC power source VAC, capacitors C1 and C2, an inductor L1, diodes D1, D2, D3 and D4, a first switch S1, a second switch S2, a third switch S3, a fourth switch S4 and an interlocking device 410. The connections among the DC power source VDC, the AC power source VAC, the capacitors C1 and C2, the inductor L1, the diodes D1, D2, D3 and D4, the first switch S1, the second switch S2, the third switch S3 and the fourth switch S4 can be referred to those in FIG. 4 and thus not described hereinafter.

The interlocking device 410 includes a control unit 420, a third interlocking circuit 430 and a fourth interlocking circuit 440. The control unit 420 generates a fifth signal PWM5, a sixth signal PWM6, a seventh signal PWM7 and an eighth signal PWM8. In one of exemplary embodiments, the fifth signal PWM5, the sixth signal PWM6, the seventh signal PWM7 and the eighth signal PWM8 are PWM signals.

Generally, when the control unit 420 operates normally, the fifth signal PWM5 and the sixth signal PWM6 complement each other, and the seventh signal PWM7 and the eighth signal PWM8 complement each other. Thus, the fifth signal PWM5 and the sixth signal PWM6 have to be interlocked, the seventh signal PWM7 and the eighth signal PWM8 have to be interlocked, and the fifth signal PWM5 and the seventh signal PWM7 have to be interlocked.

The third interlocking circuit 430 couples with the first switch S1 and the second switch S2, and receives the fifth signal PWM5, the sixth signal PWM6 and the eighth signal PWM8. The third interlocking circuit 430 generates a fifth locking signal CS5 for controlling whether to conduct the first switch S1 according to the logic levels of the fifth signal PWM5, the sixth signal PWM6 and the eighth signal PWM8, and generates a sixth locking signal CS6 for controlling whether to conduct the second switch S2 according to the logic levels of the fifth signal PWM5 and the sixth signal PWM6.

The fourth interlocking circuit 440 couples with the third switch S3 and the fourth switch S4, and receives the sixth signal PWM6, the seventh signal PWM7 and the eighth signal PWM8. The fourth interlocking circuit 440 generates a seventh locking signal CS7 for controlling whether to conduct the third switch S3 according to the logic levels of the sixth signal PWM6, the seventh signal PWM7 and the eighth signal PWM8, and generates an eighth locking signal CS8 for controlling whether to conduct the fourth switch S4 according to the logic levels of the seventh signal PWM7 and the eighth signal PWM8.

More particularly, in one of exemplary embodiments, if the fifth signal PWM5 and the sixth signal PWM6 are at a low logic level, the third interlocking circuit 430 generates the fifth locking signal CS5 and the sixth locking signal CS6, both of which are, for example, at a low logic level to turn off the first switch S1 and the second switch S2 respectively. Thus, the capacitor C1, the first switch S1, the diode D4 and the second switch S2 can be prevented from forming a short circuitry loop which is caused due to malfunctions and will damage circuits.

In one of exemplary embodiments, if the fifth signal PWM5 and the seventh signal PWM7 are at a low logic level, the eighth signal PWM8 is at a high logic level because the eighth signal PWM8 and the seventh signal PWM7 complement each other. Herein, the third interlocking circuit 430 generates the fifth locking signal CS5, which is, for example, at a low logic level to turn off the first switch S1. Thus, the capacitors C1 and C2, the first switch S1 and the third switch S3 can be prevented from forming a short circuitry loop which is caused due to malfunctions and will damage circuits.

In one of exemplary embodiments, if the fifth signal PWM5, the sixth signal PWM6 and the seventh signal PWM7 are at a low logic level, the eighth signal PWM8 is at a high logic level because the eighth signal PWM8 and the seventh signal PWM7 complement each other. Herein, the third interlocking circuit 430 generates the fifth locking signal CS5 and the sixth locking signal CS6, both of which are, for example, at a low logic level to turn off the first switch S1 and the second switch S2 respectively, and to turn off the first switch S1 and the third switch S3 respectively. Thus, the capacitor C1, the first switch S1, the diode D4 and the second switch S2 can be prevented from forming the first short circuit loop, and the capacitors C1 and C2, the first switch S1 and the third switch S3 can be prevented from forming the second short circuit loop, where these short circuit loops will damage circuits due to malfunctions.

In one of exemplary embodiments, if the seventh signal PWM7 and the eighth signal PWM8 are at a low logic level, the fourth interlocking circuit 440 generates the seventh locking signal CS7 and the eighth locking signal CS8, both of which are, for example, at a low logic level to turn off the third switch S3 and the fourth switch S4 respectively. Thus, the capacitor C2, the diode D2, the fourth switch S4 and the third switch S3 can be prevented from forming a short circuitry loop which is caused due to malfunctions and will damage circuits.

In one of exemplary embodiments, if the fifth signal PWM5, the seventh signal PWM7 and the eighth signal PWM8 are at a low logic level, the sixth signal PWM6 is at a high logic level because the sixth signal PWM6 and the fifth signal PWM5 complement each other. Herein, the fourth interlocking circuit 440 generates the seventh locking signal CS7 and the eighth locking signal CS8, both of which are, for example, at a low logic level to turn off the third switch S3 and the fourth switch S4 respectively, and to turn off the first switch S1 and the third switch S3 respectively. Thus, the capacitor C2, the diode D2, the fourth switch S4 and the third switch S3 can be prevented from forming the first short circuit loop, and the capacitors C1 and C2, the first switch S1 and the third switch S3 can be prevented from forming the second short circuit loop, where these short circuit loops will damage circuits due to malfunctions.

In one of exemplary embodiments, if the fifth signal PWM5, the sixth signal PWM6, the seventh signal PWM7 and the eighth signal PWM8 are at a low logic level, the third interlocking circuit 430 generates the fifth locking signal CS5 and the sixth locking signal CS6, both of which are, for example, at a low logic level to turn off the first switch S1 and the second switch S2 respectively, and the fourth interlocking circuit 440 generates the seventh locking signal CS7 and the eighth locking signal CS8, both of which are, for example, at a low logic level to turn off the third switch S3 and the fourth switch S4 respectively. Thus, the capacitor C1, the first switch S1, the diode D4 and the second switch S2 can be prevented from forming the first short circuit loop, the capacitor C2, the diode D2, the fourth switch S4 and the third switch S3 can be prevented from forming the second short circuit loop, the capacitors C1 and C2, the first switch S1 and the third switch S3 can be prevented from forming the third short circuit loop, where these short circuit loops will damage circuits due to malfunctions.

Figure 5:
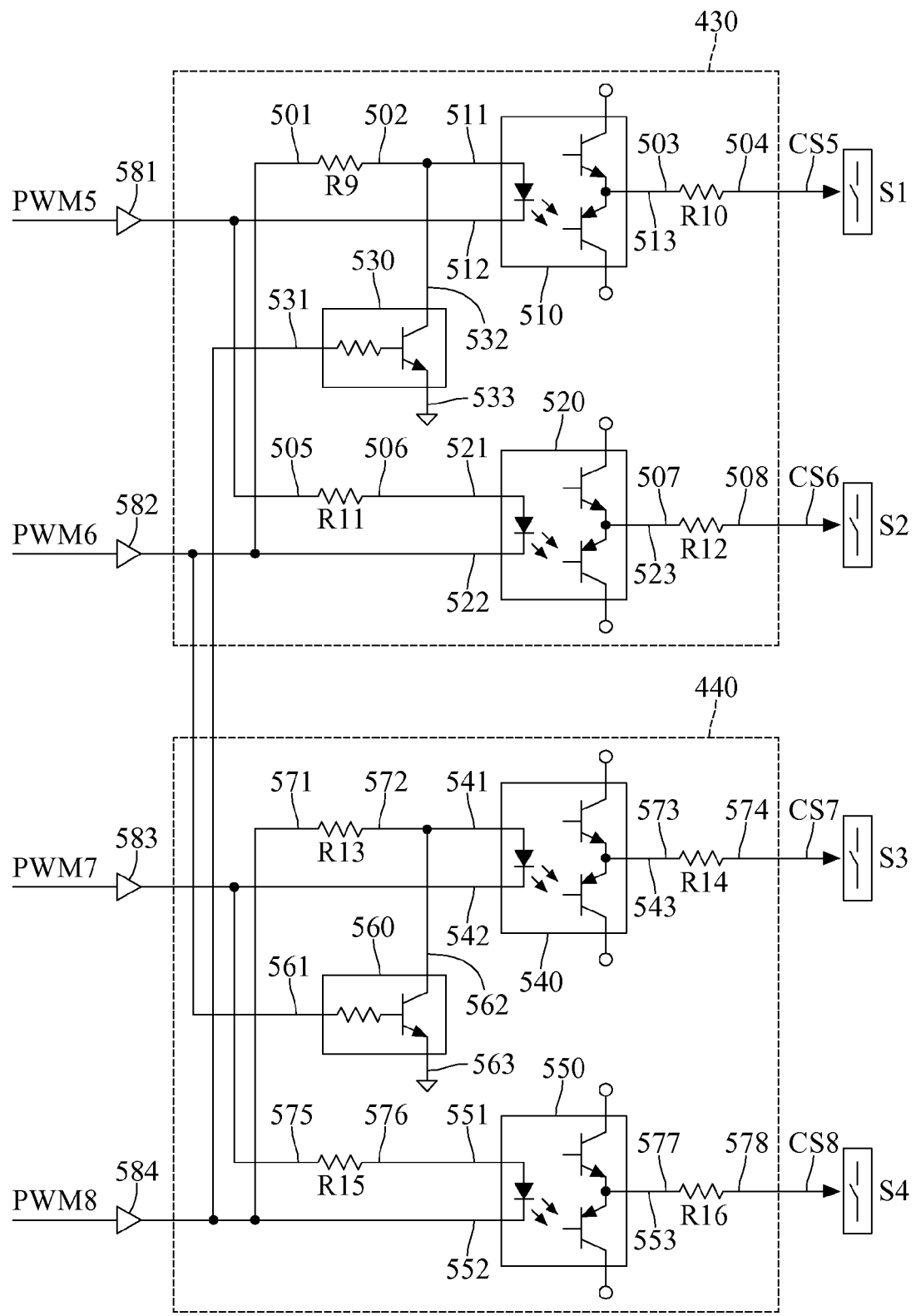
FIG. 5 is a schematic view of the first interlocking circuit and the second interlocking circuit in FIG. 4.

FIG. 5 is a schematic view of the first interlocking circuit and the second interlocking circuit in FIG. 4. The third interlocking circuit 430 includes a ninth resistor R9, a fifth locking unit 510, a tenth resistor R10, an eleventh resistor R11, a sixth locking unit 520, a twelfth resistor R12 and a third control unit 530. The ninth resistor R9 has a first end 501 for receiving a sixth signal PWM6, and a second end 502.

The fifth locking unit 510 has a first end 511, a second end 512 and a third end 513. The first end 511 of the fifth locking unit 510 couples with the second end 502 of the ninth resistor R9, the second end 512 of the fifth locking unit 510 receives the fifth signal PWM5. The tenth resistor R10 has a first end 503 and a second end 504. The first end 503 of the tenth resistor R10 couples with the third end 513 of the fifth locking unit 510, and the second end 504 of the tenth resistor R10 couples with the first switch S1. The eleventh resistor R11 has a first end 505 and a second end 506, and the first end 505 of the eleventh resistor R11 receives the fifth signal PWM5.

The sixth locking unit 520 has a first end 521, a second end 522 and a third end 523. The first end 521 of the sixth locking unit 520 couples with the second end 506 of the eleventh resistor R11, and the second end 522 of the sixth locking unit 520 receives the sixth signal PWM6. The twelfth resistor R12 has a first end 507 and a second end 508. The first end 507 of the twelfth resistor R12 couples with the third end 523 of the sixth locking unit 520, and the second end 508 of the twelfth resistor R12 couples with the second switch S2.

The third control unit 530 has a first end 531, a second end 532 and a third end 533. The first end 531 of the third control unit 530 receives the seventh signal PWM7, the second end 532 of the third control unit 530 couples with the second end 502 of the ninth resistor R9, and the third end 533 of the third control unit 530 is grounded.

In this exemplary embodiment, the internal components and related connections of the third control unit 530 are shown in FIG. 5 and can be referred to the first control unit 230 in FIG. 2. Moreover, the fifth locking unit 510 and the sixth locking unit 520 are, for example, phtocouplers, and the internal components and related connections of the fifth locking unit 510 and of sixth locking unit 520 are shown in FIG. 5 and can referred to the first locking unit 210 and the second locking unit 220 in FIG. 2 respectively.

The fourth interlocking circuit 440 includes a thirteenth resistor R13, a seventh locking unit 540, a fourteenth resistor R14, a fifteenth resistor R15, an eighth locking unit 550, a sixteenth resistor R16 and a fourth control unit 560. The thirteenth resistor R13 has a first end 571 and a second end 572, and the first end 571 of the thirteenth resistor R13 receives the eighth signal PWM8.

The seventh locking unit 540 has a first end 541, a second end 542 and a third end 543. The first end 541 of the seventh locking unit 540 couples with the second end 572 of the thirteenth resistor R13, and the second end 542 of the seventh locking unit 540 receives the seventh signal PWM7. The fourteenth resistor R14 has a first end 573 and a second end 574. The first end 573 of the fourteenth resistor R14 couples with the third end 543 of the seventh locking unit 540, and the second end 574 of the fourteenth resistor R14 couples with the third switch S3. The fifteenth resistor R15 has a first end 575 and a second end 576, and the first end 575 of the fifteenth resistor R15 receives the seventh signal PWM7.

The eighth locking unit 550 has a first end 551, a second end 552 and a third end 553. The first end 551 of the eighth locking unit 550 couples with the second end 576 of the fifteenth resistor R15, and the second end 552 of the eighth locking unit 550 receives the eighth signal PWM8. The sixteenth resistor R16 has a first end 577 and a second end 578. The first end 577 of the sixteenth resistor R16 couples with the third end 553 of the eighth locking unit 550, and the second end 578 of the sixteenth resistor R16 couples with the fourth switch S4.

The fourth control unit 560 has a first end 561, a second end 562 and a third end 563. The first end 561 of the fourth control unit 560 receives the sixth signal PWM6, the second end 562 of the fourth control unit 560 couples with the second end 572 of the thirteenth resistor R13, and the third end 563 of the fourth control unit 560 is grounded.

In this exemplary embodiment, the internal components and related connections of the fourth control unit 560 are shown in FIG. 5 and can be referred to the description of the second control unit 260 in FIG. 2. Moreover, the seventh locking unit 540 and the eighth locking unit 550 are, for example, phtocouplers, and the internal components and related connections of the seventh locking unit 540 and the eighth locking unit 550 are shown in FIG. 5 and can be referred to the descriptions of the third locking unit 240 and the fourth locking unit 250 in FIG. 2 respectively.

In addition, the interlocking device 400 includes a fifth buffer 581, a sixth buffer 582, a seventh buffer 583 and an eighth buffer 584. The fifth buffer 581 couples with a transmission path for the fifth signal PWM5, and increases the gain of the fifth signal PWM5. The sixth buffer 582 couples with a transmission path for the sixth signal PWM6, and increases the gain of the sixth signal PWM6. The seventh buffer 583 couples with a transmission path for the seventh signal PWM7, and increases the gain of the seventh signal PWM7. The eighth buffer 584 couples with a transmission path for the eighth signal PWM8, and increases the gain of the eighth signal PWM8.

In this exemplary embodiment, the operation of the third interlocking circuit 430 and the operation of the fourth interlocking circuit 440 can be referred to the descriptions related to FIG. 2 and FIG. 4 respectively and not described again hereinafter. Through the third interlocking circuit 430 and the fourth interlocking circuit 440, the DAC 400 can be prevented from forming short circuits which are caused due to malfunctions, so as to enhance the safety and stability of circuit operation.

In the aforementioned exemplary embodiments, the DAC 400 belongs to a single-phase one, and however, the disclosure will not be limited thereto. Other exemplary embodiments are described below.

Figure 6A:
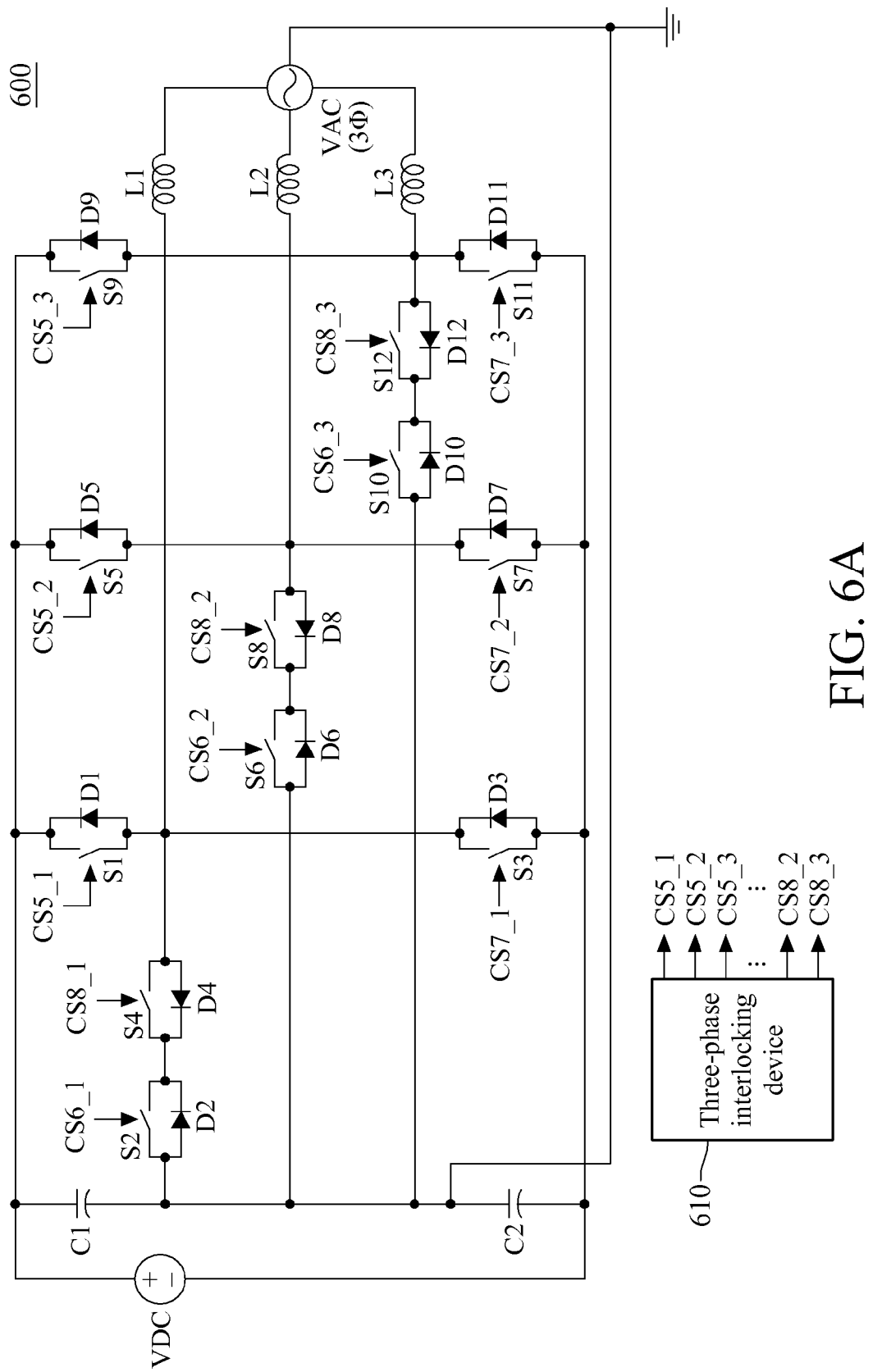
FIG. 6A is a schematic view of a fourth embodiment of a three-phase DAC.
Figure 6B:
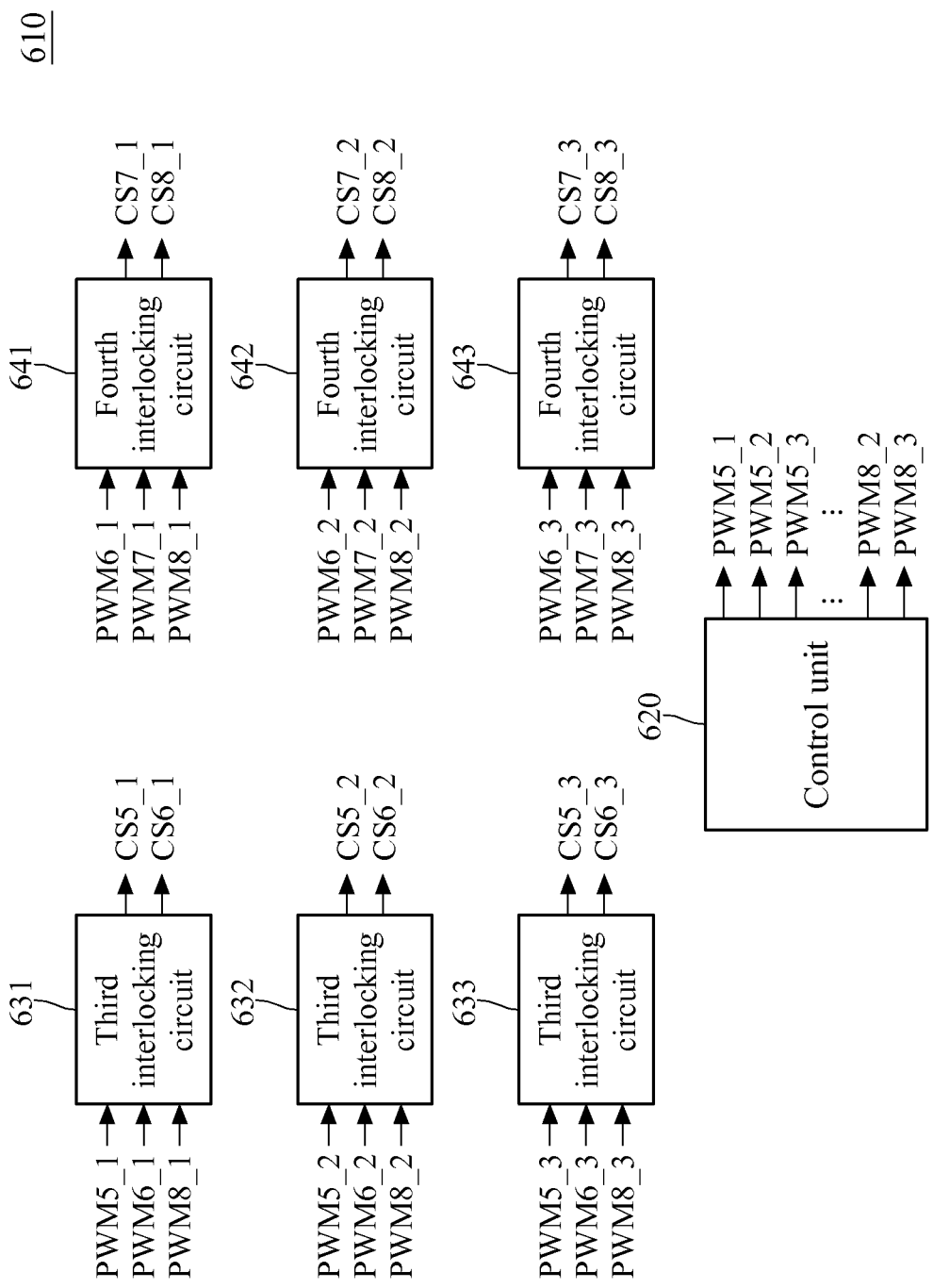
FIG. 6B is a schematic view of the three-phase interlocking device in FIG. 6A.

FIG. 6A is a schematic view of the fourth embodiment of a three-phase DAC, and FIG. 6B is a schematic view of the three-phase interlocking device in FIG. 6A. The three-phase DAC includes a DC power source VDC, a three-phase AC power source VAC (3Φ), capacitors C1 and C2, inductors L1, L2 and L3, diodes D1, D2, D3, D4, D5, D6, D7, D8, D9, D10, D11 and D12, a first switch S1, a second switch S2, a third switch S3, a fourth switch S4, a fifth switch S5, a sixth switch S6, a seventh switch S7, an eighth switch S8, a ninth switch S9, a tenth switch S10, an eleventh switch S11, a twelfth switch S12 and a three-phase interlocking device 610, and the connections among these components are shown in FIG. 6A and thus not described again hereinafter. For example, the three-phase interlocking device 610 belongs to a low level triggered one.

The three-phase interlocking device 610 includes a control unit 620, third interlocking circuits 631, 632 and 633 and fourth interlocking circuits 641, 642 and 643, as shown in FIG. 6B. The control unit 620 generates fifth signals PWM5_1, PWM5$_{13}$2 and PWM5_3, sixth signals PWM6_1, PWM6_2 and PWM6_3, seventh signals PWM7_1, PWM7_2 and PWM7_3, eighth signals PWM8_1, PWM8_2 and PWM8_3.

In this exemplary embodiment, the phase difference between any two of the fifth signals PWM5_1, PWM5_2 and PWM5_3 is 120 degrees, the phase difference between any two of the sixth signals PWM6_1, PWM6_2 and PWM6_3 is 120 degrees, the phase difference between any two of the seventh signals PWM7_1, PWM7_2 and PWM7_3 is 120 degrees, and the phase difference between any two of the eighth signals PWM8_1, PWM8_2 and PWM8_3 is 120 degrees.

The third interlocking circuit 631 couples with the first switch S1 and the second switch S2, and receives the fifth signal PWM5_1, the sixth signal PWM6_1 and the eighth signal PWM8_1. The third interlocking circuit 631 generates a fifth locking signal CS5_1 for controlling whether to conduct the first switch S1 according to the logic levels of the fifth signal PWM5_1, the sixth signal PWM6_1 and the eighth signal PWM8_1, and generates a sixth locking signal CS6_1 for controlling whether to turn on the second switch S2 according to the logic levels of the fifth signal PWM5_1 and the sixth signal PWM6_1.

The fourth interlocking circuit 641 couples with the third switch S3 and the fourth switch S4, and receives the sixth signal PWM6_1, the seventh signal PWM7_1 and the eighth signal PWM8_1. The fourth interlocking circuit 641 generates a seventh locking signal CS7_1 for controlling whether to conduct the third switch S3 according to the logic levels of the sixth signal PWM6_1, the seventh signal PWM7_1 and the eighth signal PWM8_1, and generates an eighth locking signal CS8_1 for controlling whether to conduct the fourth switch S4 according to the logic levels of the seventh signal PWM7_1 and the eighth signal PWM8_1.

The third interlocking circuit 632 couples with the fifth switch S5 and the sixth switch S6, and receives the fifth signal PWM5_2, the sixth signal PWM6_2 and the eighth signal PWM8_2. The third interlocking circuit 632 generates a fifth locking signal CS5_2 for controlling whether to conduct the fifth switch S5 according to the logic levels of the fifth signal PWM5_2, the sixth signal PWM6_2 and the eighth signal PWM8_2, and generates a sixth locking signal CS6_2 for controlling whether to conduct the sixth switch S6 according to the logic levels of the fifth signal PWM5_2 and the sixth signal PWM6_2.

The fourth interlocking circuit 642 couples with the seventh switch S7 and the eighth switch S8, and receives the sixth signal PWM6_2, the seventh signal PWM7_2 and the eighth signal PWM8_2. The fourth interlocking circuit 642 generates a seventh locking signal CS7_2 for controlling whether to conduct the seventh switch S7 according to the logic levels of the sixth signal PWM6_2, the seventh signal PWM7_2 and the eighth signal PWM8_2, and generates an eighth locking signal CS8_2 for controlling whether to conduct the eighth switch S8 according to the logic levels of the seventh signal PWM7_2 and the eighth signal PWM8_2.

The third interlocking circuit 633 couples with the ninth switch S9 and the tenth switch S10, and receives the fifth signal PWM5_3, the sixth signal PWM6_3 and the eighth signal PWM8_3. The third interlocking circuit 633 generates a fifth locking signal CS5_3 for controlling whether to conduct the ninth switch S9 according to the logic levels of the fifth signal PWM5_3, the sixth signal PWM6_3 and the eighth signal PWM8_3, and generates a sixth locking signal CS6_3 for controlling whether to conduct the tenth switch S10 according to the logic levels of the fifth signal PWM5_3 and the sixth signal PWM6_3.

The fourth interlocking circuit 643 couples with the eleventh switch S11 and the twelfth switch S12, and receives the sixth signal PWM6_3, the seventh signal PWM7_3 and the eighth signal PWM8_3. The fourth interlocking circuit 643 generates a seventh locking signal CS7_3 for controlling whether to conduct the eleventh switch S11 according to the logic levels of the sixth signal PWM6_3, the seventh signal PWM7_3 and the eighth signal PWM8_, and generates an eighth locking signal CS8_3 for controlling whether to conduct the twelfth switch S12 according to the logic levels of the seventh signal PWM7_3 and the eighth signal PWM8_3.

The operation of the third interlocking circuits 631, 632 and 633 and the operation of the fourth interlocking circuits 641, 642 and 643 can be referred to the descriptions about the third interlocking circuit 430 and the fourth interlocking circuit 440 in FIG. 4 respectively. The internal components, related connection and related operation of the third interlocking circuits 631, 632 and 633, and the internal components, related connection and related operation of the fourth interlocking circuits 641, 642 and 643 can be referred to the descriptions of the third interlocking circuit 430 and the fourth interlocking circuit 440 in FIG. 5 respectively and thus not described again hereinafter. Thus, the three-phase DAC 600 employing the third interlocking circuits 631, 632 and 633 and the fourth interlocking circuits 641, 642 and 643 in the three-phase interlocking device 610, may efficiently prevented from forming short circuits which are caused due to malfunctions, so as to enhance the safety of circuit operation.

In view of the aforementioned description related to FIG. 4, the first switch S1 to the fourth switch S4 are conducted because of the fifth signal PWM5 to the eighth signal PWM8 at a low logic level. In view of the aforementioned description related to FIG. 6A and FIG. 6B, the first switch S1 to the twelfth switch S12 are conducted because of the fifth signal PWM5_1 to the eighth signal PWM8_3 at a low logic level. Accordingly, the interlocking device 410 in FIG. 4 belongs to a low level triggered one, and the three-phase interlocking device 610 in FIG. 6A and FIG. 6B is a low level triggered one.

According to the aforementioned exemplary embodiments of the DAC in the disclosure, the high level triggered (or low level triggered) interlocking device and the high level triggered (or low level triggered) three-phase interlocking device employ the first interlocking circuit (or the third interlocking circuit) to control the turned-on or turned-off of the first switch according to the logic levels of the first signal, the second signal and the third signal (or the fifth signal, the sixth signal and the eighth signal) and control the turned-on or turned-off of the second switch according to the logic levels of the first signal and the second signal (or the fifth signal and the sixth signal). Moreover, the high level triggered (or low level triggered) interlocking device and the high level triggered (or low level triggered) three-phase interlocking device employ the second interlocking circuit (or the fourth interlocking circuit) control the turned-on or turned-off of the third switch according to the logic levels of the first signal, the third signal and the fourth signal (or the sixth signal, the seventh signal and the eighth signal) and control the turned-on or turned-off of the fourth switch according to the logic levels of the third signal and the fourth signal (or the seventh signal and the eighth signal). Therefore, the DAC can be prevented from forming short circuits which are caused due to the malfunctions, so as to enhance the safety of circuit operation.

What is claimed is:

1. An interlocking device for a DC to AC converter (DAC), comprising:
    a first interlocking circuit, coupled to a first switch and a second switch and configured to receive a first signal, a second signal and a third signal, generate a first locking signal for controlling whether to turn on the first switch according to logic levels of the first signal, the second signal and the third signal, and generate a second locking signal for controlling whether to turn on the second switch according to the logic levels of the first signal and the second signal; and
    a second interlocking circuit, coupled to a third switch and a fourth switch and configured to receive the first signal, the third signal and a fourth signal, generate a third locking signal for controlling whether to turn on the third switch according to the logic levels of the first signal and the third signal and a logic level of the fourth signal, and generate a fourth locking signal for controlling whether to turn on the fourth switch according to the logic levels of the third signal and the fourth signal.

2. The interlocking device according to claim 1, wherein when the first signal and the second signal are at a high logic level, the first interlocking circuit generates the first locking signal and the second locking signal, for respectively turning off the first switch and the second switch.

3. The interlocking device according to claim 1, wherein when the first signal and the third signal are at a high logic level, the first interlocking circuit generates the first locking signal for turning off the first switch.

4. The interlocking device according to claim 1, wherein when the first signal, the second signal and the third signal are at a high logic level, the first interlocking circuit generates the first locking signal and the second locking signal, for respectively turning off the first switch and the second switch.

5. The interlocking device according to claim 1, wherein when the third signal and the fourth signal are at a high logic level, the second interlocking circuit generates the third locking signal and the fourth locking signal, for respectively turning off the third switch and the fourth switch.

6. The interlocking device according to claim 1, wherein when the first signal, the third signal and the fourth signal are at a high logic level, the second interlocking circuit generates the third locking signal and the fourth locking signal, for respectively turning off the third switch and the fourth switch.

7. The interlocking device according to claim 1, wherein when the first signal, the second signal, the third signal and the fourth signal are at a high logic level, the first interlocking circuit generates the first locking signal and the second locking signal, for respectively turning off the first switch and the second switch, and the second interlocking circuit generates the third locking signal and the fourth locking signal, for respectively turning off the third switch and the fourth switch.

8. The interlocking device according to claim 1, wherein the first interlocking circuit comprises:
    a first resistor which has a first end for receiving the first signal, and a second end;
    a first locking unit which has a first end coupled to the second end of the first resistor, a second end for receiving the second signal, and a third end;
    a second resistor which has a first end coupled to the third end of the first locking unit, and a second end coupled to the first switch;
    a third resistor which has a first end for receiving the second signal, and a second end;
    a second locking unit which has a first end coupled to the second end of the third resistor, a second end for receiving the first signal, and a third end;
    a fourth resistor which has a first end coupled to the third end of the second locking unit, and a second end coupled to the second switch; and
    a first control unit which has a first end for receiving the third signal, a second end coupled to the second end of the first resistor, and a third end grounded.

9. The interlocking device according to claim 8, wherein the second interlocking circuit comprises:
    a fifth resistor which has a first end for receiving the third signal, and a second end;
    a third locking unit which has a first end coupled to the second end of the fifth resistor, a second end for receiving the fourth signal, and a third end;
    a sixth resistor which has a first end coupled to the third end of the third locking unit, and a second end coupled to the third switch;
    a seventh resistor which has a first end for receiving the fourth signal, and a second end;
    a fourth locking unit which has a first end coupled to the second end of the seventh resistor, a second end for receiving the third signal, and a third end;

an eighth resistor which has a first end coupled to the third end of the fourth locking unit, and a second end coupled to the fourth switch; and a second control unit which has a first end for receiving the first signal, a second end coupled to the second end of the fifth resistor, and a third end grounded.

10. The interlocking device according to claim 9, further comprising:
   a first buffer, coupled to a transmission path for the first signal, and configured to increase a gain of the first signal;
   a second buffer, coupled to a transmission path for the second signal, and configured to increase a gain of the second signal;
   a third buffer, coupled to a transmission path for the third signal, and configured to increase a gain of the third signal; and
   a fourth buffer, coupled to a transmission path for the fourth signal, and configured to increase a gain of the fourth signal.

11. A three-phase interlocking device which comprises three interlocking devices in claim 1 and is adapted to a three-phase DAC which comprises three switch sets each of which comprises the first switch, the second switch, the third switch and the fourth switch, wherein the three interlocking devices respectively correspond to the three switch sets, each of the three switch sets interlocks the corresponding switch set according to a signal set, a phase difference associated with the three signal sets is 120 degrees, and each of the three signal sets comprises the first signal, the second signal, the third signal and the fourth signal.

12. An interlocking device of a DAC, comprising:
   a third interlocking circuit, coupled to a first switch and a second switch, and configured to receive a fifth signal, a sixth signal and an eighth signal, generate a fifth locking signal for controlling whether to turn on the first switch according to logic levels of the fifth signal, the sixth signal and the eighth signal, and generate a sixth locking signal for controlling whether to turn on the second switch according to the logic levels of the fifth signal and the sixth signal; and
   a fourth interlocking circuit, coupled to a third switch and a fourth switch, and configured to receive the sixth signal, a seventh signal and the eighth signal, generate a seventh locking signal for controlling whether to turn on the third switch according to the logic levels of the sixth signal and the eighth signal and a logic level of the seventh signal, and generate an eighth locking signal for controlling whether to turn on the fourth switch according to the logic levels of the seventh signal and the eighth signal.

13. The interlocking device according to claim 12, wherein when the fifth signal and the sixth signal are at a low logic level, the third interlocking circuit generates the fifth locking signal and the sixth locking signal, for respectively turning off the first switch and the second switch.

14. The interlocking device according to claim 12, wherein when the fifth signal and the seventh signal are at a low logic level, the third interlocking circuit generates the fifth locking signal for turning off the first switch.

15. The interlocking device according to claim 12, wherein when the fifth signal, the sixth signal and the seventh signal are at a low logic level, the third interlocking circuit generates the fifth locking signal and the sixth locking signal, for turning off the first switch and the second switch respectively, and turning off the first switch and the third switch respectively.

16. The interlocking device according to claim 12, wherein when the seventh signal and the eighth signal are at a low logic level, the fourth interlocking circuit generates the seventh locking signal and the eighth locking signal, for respectively turning off the third switch and the fourth switch.

17. The interlocking device according to claim 12, wherein when the fifth signal, the seventh signal and the eighth signal are at a low logic level, the fourth interlocking circuit generates the seventh locking signal and the eighth locking signal, for turning off the third switch and the fourth switch respectively, and turning off the first switch and the third switch respectively.

18. The interlocking device according to claim 12, wherein when the fifth signal, the sixth signal, the seventh signal and the eighth signal are at a low logic level, the third interlocking circuit generates the fifth locking signal and the sixth locking signal, for respectively turning off the first switch and the second switch and the fourth interlocking circuit generates the seventh locking signal and the eighth locking signal, for respectively turning off the third switch and the fourth switch.

19. The interlocking device according to claim 12, wherein the third interlocking circuit comprises:
   a ninth resistor which has a first end for receiving the sixth signal, and a second end;
   a fifth locking unit which has a first end coupled to the second end of the ninth resistor, a second end for receiving the fifth signal, and a third end;
   a tenth resistor which has a first end coupled to the third end of the fifth locking unit, and a second end coupled to the first switch;
   an eleventh resistor which has a first end for receiving the fifth signal, and a second end;
   a sixth locking unit which has a first end coupled to the second end of the eleventh resistor, a second end for receiving the sixth signal, and a third end;
   a twelfth resistor which has a first end coupled to the third end of the sixth locking unit, and a second end coupled to the second switch; and
   a third control unit which has a first end for receiving the eighth signal, a second end coupled to the second end of the ninth resistor, and a third end grounded.

20. The interlocking device according to claim 19, wherein the fourth interlocking circuit comprises:
   a thirteenth resistor which a first end for receiving the eighth signal, and a second end;
   a seventh locking unit which has a first end coupled to the second end of the thirteenth resistor, a second end for receiving the seventh signal, and a third end;
   a fourteenth resistor which has a first end coupled to the third end of the seventh locking unit, and a second end coupled to the third switch;
   a fifteenth resistor which has a first end for receiving the seventh signal, and a second end;
   an eighth locking unit which has a first end coupled to the second end of the fifteenth resistor, a second end for receiving the eighth signal, and a third end;
   a sixteenth resistor which has a first end coupled to the third end of the eighth locking unit, and a second end coupled to the fourth switch; and
   a fourth control unit which has a first end for receiving the sixth signal, a second end coupled to the second end of the thirteenth resistor, and a third end grounded.

21. The interlocking device according to claim 20, further comprising:
   a fifth buffer, coupled to a transmission path for the fifth signal, and configured to increase a gain of the fifth signal;

a sixth buffer, coupled to a transmission path for the sixth signal, and configured to increase a gain of the sixth signal;

a seventh buffer, coupled to a transmission path for the seventh signal, and configured to increase a gain of the seventh signal; and an eighth buffer, coupled to a transmission path for the eighth signal, and configured to increase a gain of the eighth signal.

22. A three-phase interlocking device which comprises three interlocking devices in claim 12 and is adapted to a three-phase DAC which comprise three switch sets each of which comprises the first switch, the second switch, the third switch and the fourth switch, wherein the three interlocking devices respectively correspond to the three switch sets, each of the three switch sets interlocks the corresponding switch set according to a signal set, a phase difference associated with the three signal sets is 120 degrees, and each of the three signal sets comprises the fifth signal, the sixth signal, the seventh signal and the eighth signal.

* * * * *